United States Patent
Stakoe et al.

(10) Patent No.: US 9,469,230 B2
(45) Date of Patent: Oct. 18, 2016

(54) METHOD OF WRAPPING A COVERING OVER A HAND GRIPPED PART AND THE WRAPPED PART

(71) Applicant: Ford Motor Company, Dearborn, MI (US)

(72) Inventors: John Andrew Stakoe, Bloomfield Hills, MI (US); David Huelke, Milan, MI (US); John Q. White, Livonia, MI (US); Mahesh Bhattacharyya, Novi, MI (US); William Bauer, Canton, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 14/635,273

(22) Filed: Mar. 2, 2015

(65) Prior Publication Data

US 2016/0257232 A1    Sep. 8, 2016

(51) Int. Cl.
| | |
|---|---|
| *B60N 3/02* | (2006.01) |
| *D05B 1/04* | (2006.01) |
| *B29C 65/08* | (2006.01) |
| *B29L 31/30* | (2006.01) |

(52) U.S. Cl.
CPC ............... *B60N 3/02* (2013.01); *B29C 65/08* (2013.01); *D05B 1/04* (2013.01); *B29L 2031/3029* (2013.01)

(58) Field of Classification Search
CPC ........ B60N 3/02; B60N 3/023; B60N 3/026; B29C 65/48; B29C 65/62
USPC .............................................. 296/1.02, 146.7
See application file for complete search history.

(56) References Cited

U.S. PATENT DOCUMENTS

| | | | |
|---|---|---|---|
| 4,686,741 A * | 8/1987 | Moore | B60N 3/02 16/438 |
| 5,298,306 A | 3/1994 | Miller | |
| 2013/0009416 A1 | 1/2013 | Wenzel et al. | |

FOREIGN PATENT DOCUMENTS

| | | |
|---|---|---|
| DE | 10057531 A1 | 6/2002 |
| JP | H10175553 A | 6/1998 |
| WO | 0108528 A1 | 2/2001 |

* cited by examiner

*Primary Examiner* — Jason S Daniels
(74) *Attorney, Agent, or Firm* — Damian Porcari; Brooks Kushman, P.C.

(57) ABSTRACT

A method of manufacturing a handle intended to be gripped by an occupant of a vehicle is shown to comprise the steps of selecting a substrate including a first part and a second part. The first part and second part are wrapped with a covering material that may be a premium material such as leather and may also include a layer of foam padding. The first part and second part are assembled together and attached to each other. After the two parts are wrapped, the first part and second part are assembled together and attached to each other. A line of stitches may be formed on the covering material before the wrapping step that are wrapped to be visible on the handle.

12 Claims, 3 Drawing Sheets

METHOD OF WRAPPING A COVERING OVER A HAND GRIPPED PART AND THE WRAPPED PART

TECHNICAL FIELD

This disclosure relates to a method of wrapping a covering material onto a substrate to form a decorative cover on a part.

BACKGROUND

Vehicle interior parts may be provided with leather or premium material coverings that are hand stitched to secure the covering and provide a luxury trim option. Examples of interior trim parts that are gripped by vehicle occupants include retractable grab handles on the headliner above the doors, steering wheels, and pillar mounted fixed grab handles. The wrapped parts are fully assembled and then wrapped and hand stitched to finish the part. One drawback of hand stitching is the added cost of the hand stitching step and added process steps. In addition, hand stitching may create gaps or wrinkles in the covering if the hand stitching is not carefully performed. Gaps or wrinkles adversely affect the final appearance of the parts and may result in added scrap or repair costs.

This disclosure is directed to solving the above problems and other problems as summarized below.

SUMMARY

A method of manufacturing a handle comprises the steps of: first, selecting a substrate that includes a first part and a second part; wrapping the first part and second part with a covering material. After the wrapping step, the first part and the second part are assembled together and attached to each other.

The method may further comprise stitching a line of decorative stitches on the covering material before the wrapping step that is intended to be visible on the handle. The stitching step may include applying two parallel lines of stitches on the covering material before wrapping the first part and the second part with the covering material. The two parallel lines of stitching may be disposed at spaced locations on the covering material before the wrapping step and may be adjacent to each other after being wrapped around the substrate.

The method may further comprise the step of assembling rings over a first end and a second end of the handle with the rings being assembled over the covering material and the first part and the second part.

In one embodiment the method, the attaching step may further comprise the additional steps of providing a plurality of heat stake posts on at least one of the first part and the second part and heat staking the first part and the second part together. Alternatively, the step of attaching the first part to the second part may be performed by one of the following steps: applying an adhesive between the parts; snapping the parts together with mating attachment features; ultrasonically welding the parts together; or friction welding the parts together.

After the parts are assembled together and attached to each other, a final assembly step may be performed to complete the handle by assembling an arm to each end of the handle after attaching the first part to the second part.

According to another aspect of this disclosure, a vehicle handle is disclosed for a vehicle interior. The handle is comprised of a substrate including a plurality of assembled parts that define a parting line between the assembled parts. A covering material includes an intermediate portion that is wrapped around the substrate and peripheral portions that are secured between the parts at the parting line.

According to other aspects of the structure of the handle, a line of stitches may be provided on the intermediate portion of the covering material that is outside the parting line and adjacent the peripheral portion to be visible on the handle. Alternatively, two parallel lines of stitches may be provided on the intermediate portion of the covering material that are outside the parting line and adjacent the peripheral portions. The two parallel lines of stitching are adjacent to each other after wrapping around the substrate to be visible on the handle.

The handle may include a first ring encircling a first end of the handle and a second ring encircling a second end of the handle end of the handle. The first ring and the second ring hold the covering material against the first part and the second part at the first end and the second end. The handle may further include an arm assembled to each end of the handle for connecting the handle to a headliner of a vehicle.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
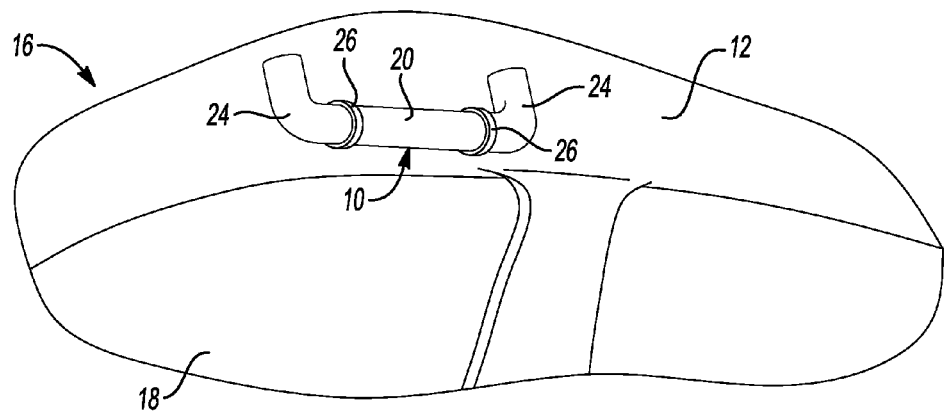
FIG. 1 is a fragmentary perspective view of a vehicle including a handle above the door opening.

Referring to FIG. 1, a handle assembly 10 is shown attached to a headliner 12, or more specifically, to the roof of a vehicle 16. The headliner 12 is attached to the roof of the vehicle 16 that provides support for the handle assembly 10. The handle assembly 10, as illustrated, is attached above the window 18 of the vehicle 16. However, it should be understood that the handle assembly 10 may be attached to a pillar that supports the roof. The handle assembly 10 includes a grip portion 20 with arms 24 extending between the grip portion 20 and the headliner 12. A pair of trim rings 26 are secured to the grip portion 20 between the grip portion 20 and the arms 24.

Figure 2A:
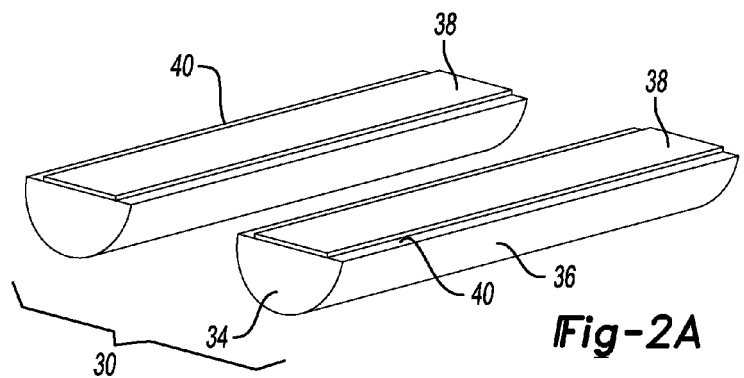
FIG. 2A is a perspective view of a two-part substrate for a handle.

Referring to FIG. 2A, a substrate 30 for the handle assembly 10 is shown to include a first part 32 and a second part 34. Each of the parts 32, 34 has an arcuate outer surface 36 and an attachment face 38. A covering relief area 40 may be provided on the attachment faces 38 of one or both the first part 32 and the second part 34. The covering relief area 40 provides relief for insertion of a portion of covering material (not shown in FIG. 2A).

Figure 2B:
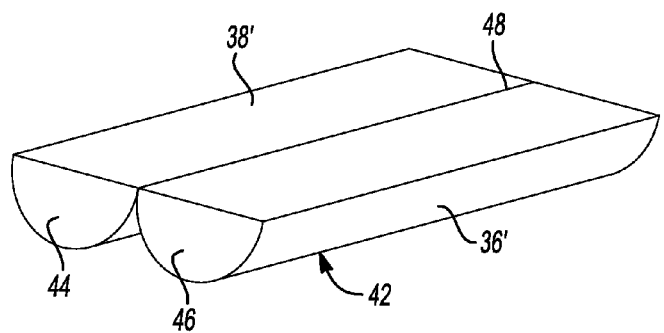
FIG. 2B is a perspective view of a two-part clamshell substrate for a handle.

Referring to FIG. 2B, an alternative embodiment of the substrate 30 is shown to be a clam shell substrate 42 that includes a first part 44 and a second part 46 that are joined at a fold line 48. The clam shell substrate 42 has an arcuate outer surface 36' and an attachment face 38' similar to the outer surface 36 and attachment face 38, as described with reference to FIG. 2A.

Figure 2C:
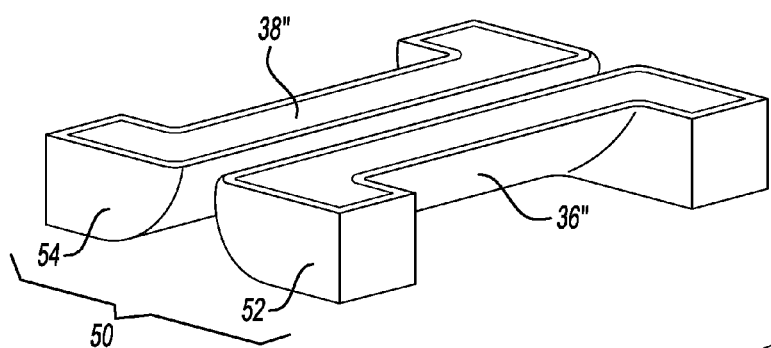
FIG. 2C is a perspective view of a two-part U-shaped substrate for a handle.

Referring to FIG. 2C, another alternative embodiment comprising a U-shaped substrate 50 is illustrated. The U-shaped substrate 50 includes a first half 52 and a second half 54. The U-shaped substrate 50 includes an arcuate outer surface 36" and an attachment face 38" that are generally similar to the embodiments shown in FIGS. 2A and 2B.

Figure 3:
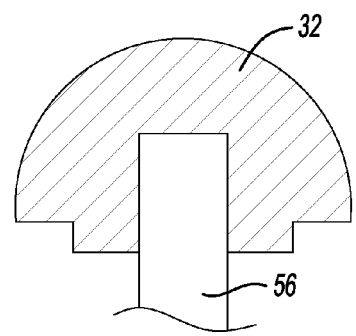
FIG. 3 is a diagrammatic view of the two-part substrate of one of the pieces of the two-part substrate shown in FIG. 2A disposed in a fixture.

Referring to FIG. 3, a first part 32 of the substrate is shown after being placed in a fixture that is diagrammatically indicated by reference numeral 56.

Figure 4:
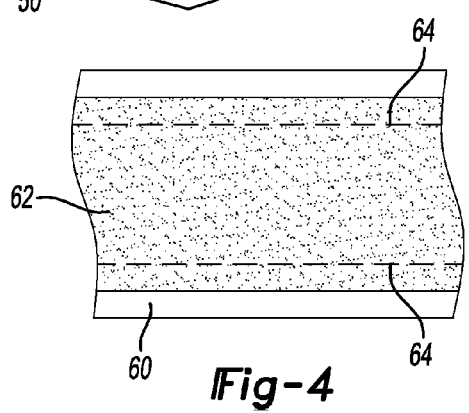
FIG. 4 is a plan view of a covering for the handle shown in FIG. 2A before being assembled to the handle substrate.

Referring to FIG. 4, a piece of covering material 60 is illustrated that may be a premium material such as leather, cloth, vinyl or the like. The covering material 60 may also be provided with foam 62 that functions as padding. The foam 62 may completely cover the one side of the covering material 60 or may be provided in a central portion of the covering material 60, as shown in FIG. 4. A line of stitching 64 is provided at one or more locations on the covering material 60. The stitching 64 may be used to secure the foam 62 to the covering material 60 or may be primarily anesthetic providing the desired hand-stitched appearance.

Figure 5:
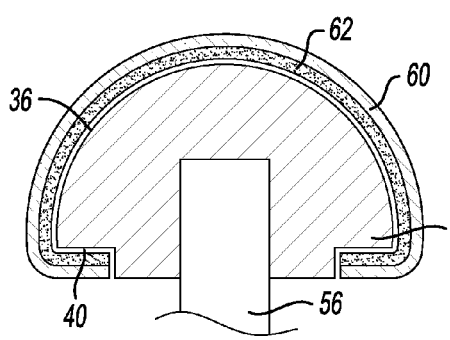
FIG. 5 is a cross-sectional view of a handle including the handle substrate as shown in FIG. 2A after being wrapped by the covering material.

Referring to FIG. 5, a first part 32 of the substrate 30 (shown in FIG. 2A) is illustrated in a fixture 56. The first part 32 is wrapped with the covering material 60 and foam pad 62 that extend about the arcuate outer surface 36 with the edges of the foam pad 62 and covering material 60 being received in covering relief areas 40 defined by the first part 32. The first part 32 is held in place by the fixture 56. It should be noted that the foam pad 62, if limited to the central portion of the covering material 60 as shown in FIG. 4, may be limited to covering the arcuate outer surface 36 without being received in the covering relief area 40.

Figure 6:
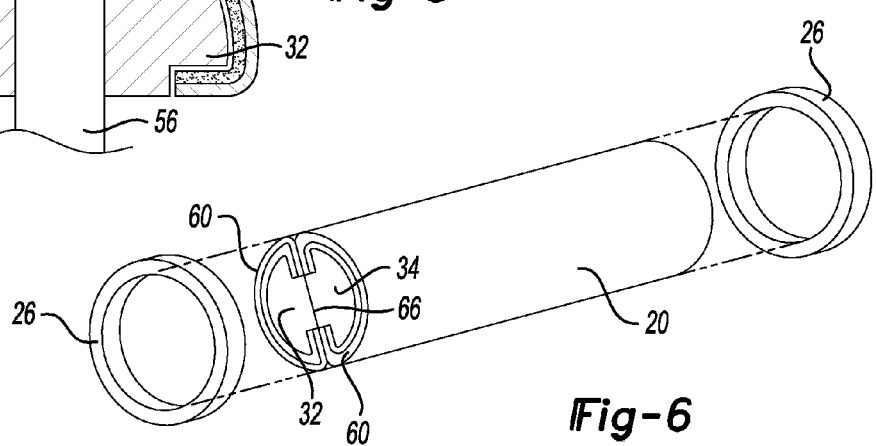
FIG. 6 is a partially exploded view showing the two parts of the handle substrate assembled together after being wrapped with the covering material and with two trim rings shown in position to be assembled to the handle.

Referring to FIG. 6, a first part 32 and second part 34 are shown after being wrapped with covering material 60 and assembled together. The first and second parts 32, 34 are attached to each other after being assembled. The first and second parts may be attached to each other by an adhesive, heat staking, snapping the parts together with mating attachment feature, ultrasonically welding, or friction welding the parts together. After attachment, trim rings 26 may be assembled to opposite ends after the first and second parts 32 and 34 are assembled together and attached.

Figure 7:
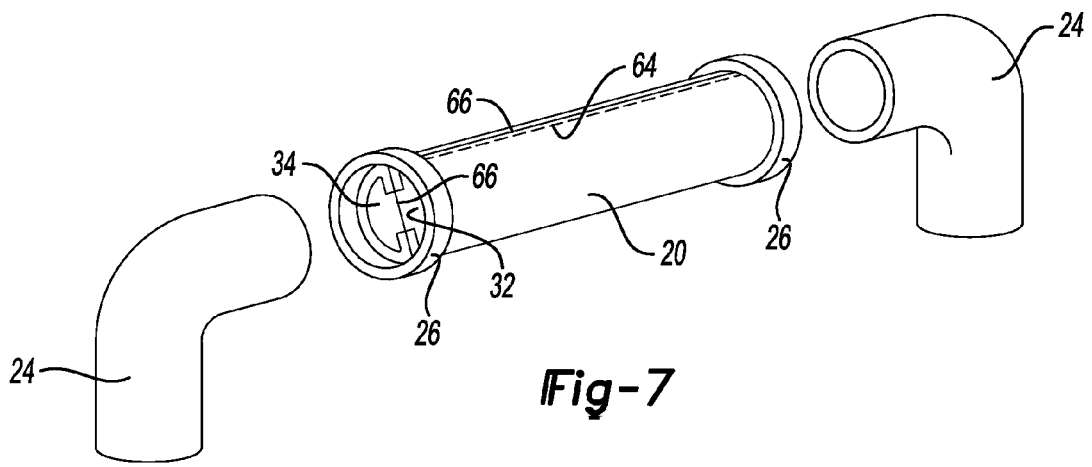
FIG. 7 is an exploded perspective view of a handle including a two-part substrate wrapped with covering material that has trim rings attached to opposite ends of the handle with two arms shown exploded away from the ends of the handle that are used to join the handle to the headliner.

Referring to FIG. 7, the next step in the process is illustrated wherein the arms 24 are assembled to the opposite sides of the grip portion 20 after the trim rings 26 are assembled. The first and second parts 32 and 34 are assembled together at a parting line 66. A line of stitching 64 is provided on one or both of the first and second parts 32 and 34. The line of stitching 64 gives a hand-stitched appearance to the handle portion 20. A parting line 66 is defined between the first part 32 and second part 34 to give the appearance of a seam that is closed by the line of stitching 64.

Figure 8:
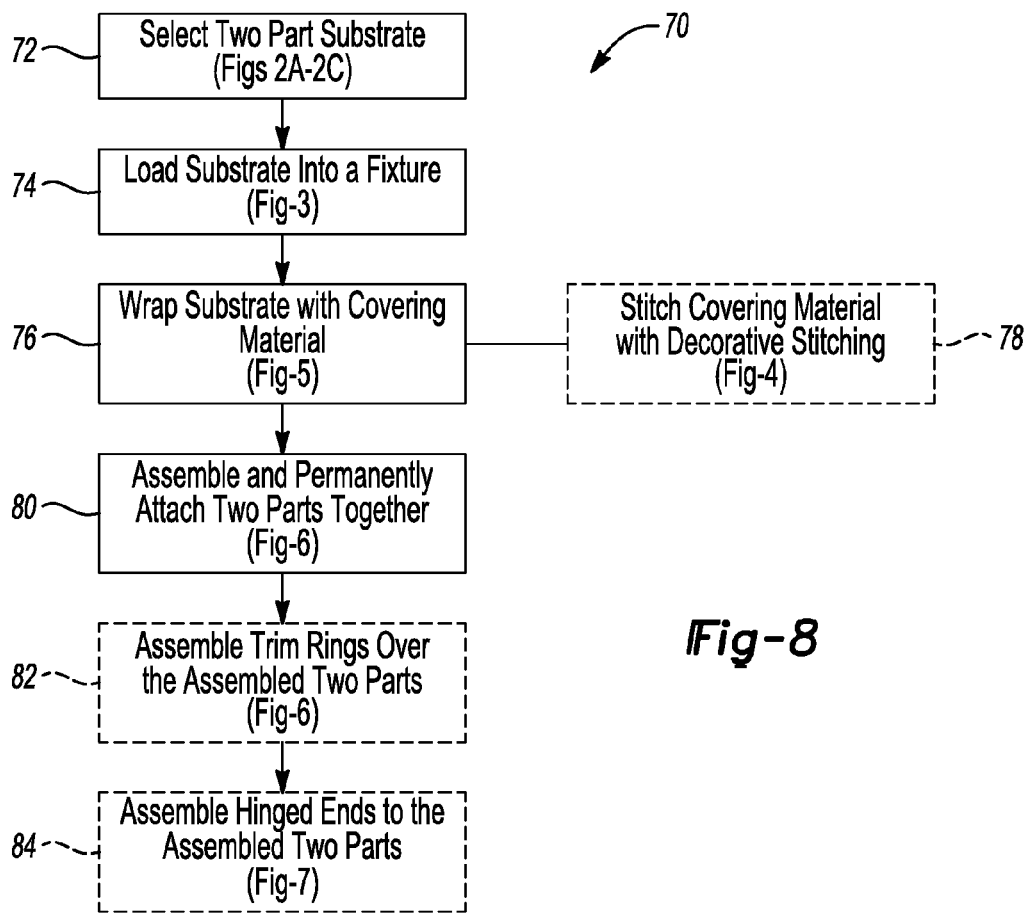
FIG. 8 is a flowchart illustrating the steps of one illustrative embodiment of the method of wrapping two-part handle substrate with a covering material.

Referring to FIG. 8, the method of wrapping a covering over a hand grip part is described with reference to a flowchart 70 that includes references to the previously described figures. In the first step of the process, a two-part substrate 30, 42, 50 is selected at 72, as shown with reference to FIGS. 2A-2C. As illustrated in FIG. 3, the substrate is loaded into a fixture at 74. The substrate 30, 42, 50 is then wrapped with a covering material 60 at 76, as shown in FIG. 5. In an alternative embodiment at 78, the covering material may be stitched with a decorative stitching at 78, as shown in FIG. 4. Stitching 64 is preferably provided before the substrate is wrapped with the covering material 60. However, it should be understood that providing decorative stitching is not a required step in the claimed process. At step 80, the two substrates are assembled and permanently attached together, as shown in FIG. 6. The trim rings 26 are then assembled over the two assembled parts at 82. The step of assembling trim rings over the assembled parts is an alternative or an optional step if trim rings are not included on the handle. The hinged ends are then assembled to the assembled two parts at 84 and as shown in FIG. 7. Step 84 is only required in the embodiments shown in FIGS. 2A and 2B and is not be required in the embodiment of FIG. 2C.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of manufacturing a handle comprising:
   selecting a substrate that includes a first and a second part;
   wrapping the first and second part with a covering material;
   assembling the first and the second part together after the above wrapping step;
   attaching the first part to the second part; and
   assembling rings over a first end and a second end of the handle over the covering material and the first and the second part.

2. The method of claim 1 further comprising:
   applying a line of stitches on the covering material before the wrapping step that is visible on the handle.

3. The method of claim 1 further comprising:
   applying two parallel lines of stitches on the covering material before wrapping the first and the second part with the covering material, wherein the two parallel lines of stitching are disposed at spaced locations on the covering material before wrapping and are adjacent to each other after wrapping around the substrate.

4. The method of claim 1 wherein the attaching step further comprises:
   providing a plurality of heat stake posts on at least one of the first part and the second part; and
   heat staking the first part and the second part together.

5. The method of claim 1 wherein the step of attaching the first part to the second part is selected from the group of steps consisting of:
   applying an adhesive between the parts;
   heat staking the parts together;
   snapping the parts together with mating attachment features;
   ultrasonically welding the parts together; and
   friction welding the parts together.

6. The method of claim 1 further comprising:
   assembling an arm to each end of the handle after attaching the first part to the second part.

7. A handle comprising:
   a substrate including a plurality of assembled parts;
   a covering including an intermediate portion wrapped around the substrate and a peripheral portion secured between the parts; and
   a first ring encircling a first end of the handle and a second ring encircling a second end of the handle, the first ring and the second ring holding the covering against the first and the second part at the first the second ends.

8. The vehicle handle of claim 7 further comprising:
   a line of stitches provided on the intermediate portion of the covering material that is outside the parting line and adjacent the peripheral portion to be visible on the handle.

9. The vehicle handle of claim 7 further comprising:
   two parallel lines of stitches provided on the intermediate portion of the covering material that are outside the parting line and adjacent the peripheral portions, wherein the two parallel lines of stitching are adjacent to each other after wrapping around the substrate to be visible on the handle.

10. The vehicle handle of claim 7 further comprising:
    providing a plurality of heat stake posts on at the assembled part that connect the assembled parts together.

11. The vehicle handle of claim 7 wherein the assembled parts are secured together by an attachment mechanism selected from the group of attachment mechanisms consisting of:
    an adhesive;
    a plurality of heat stakes;
    a set of mating attachment snaps;
    an ultrasonic weld; and
    a friction weld.

12. The vehicle handle of claim 7 further comprising:
    an arm assembled to each end of the handle that connect the handle to a headliner of a vehicle.

* * * * *